US008078752B2

(12) United States Patent
Maze et al.

(10) Patent No.: US 8,078,752 B2
(45) Date of Patent: Dec. 13, 2011

(54) METHOD AND PROGRAM FOR MANAGING THE QUANTITY OF DATA TRANSMITTED BY A TRANSMISSION DEVICE OVER A TELECOMMUNICATION NETWORK

(75) Inventors: Frederic Maze, Langan (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 12/260,667

(22) Filed: Oct. 29, 2008

(65) Prior Publication Data

US 2009/0113048 A1    Apr. 30, 2009

(30) Foreign Application Priority Data

Oct. 30, 2007  (FR) ...................................... 07 07632

(51) Int. Cl.
*G06F 15/16* (2006.01)
*H04L 12/26* (2006.01)

(52) U.S. Cl. ..... 709/232; 370/235; 370/230; 370/230.1; 709/231; 709/233

(58) Field of Classification Search .......... 370/230–235, 370/229, 230.1; 709/233, 235, 223, 224, 709/231, 232
See application file for complete search history.

(56) References Cited

U.S. PATENT DOCUMENTS

| | | | |
|---|---|---|---|
| 5,367,523 A | 11/1994 | Chang et al. | 370/84 |
| 6,453,351 B1 * | 9/2002 | Endo | 709/229 |
| 6,614,755 B1 * | 9/2003 | Dote | 370/230 |
| 7,457,820 B1 | 11/2008 | Viger et al. | 707/103 R |
| 7,583,594 B2 * | 9/2009 | Zakrzewski | 370/229 |
| 7,613,820 B1 * | 11/2009 | Abbasi et al. | 709/232 |
| 2003/0103460 A1 * | 6/2003 | Kamath et al. | 370/236.2 |
| 2004/0024910 A1 * | 2/2004 | Marl et al. | 709/248 |
| 2004/0098748 A1 | 5/2004 | Bo et al. | 725/105 |
| 2004/0151113 A1 * | 8/2004 | Zakrzewski | 370/230 |
| 2004/0267956 A1 * | 12/2004 | Leon et al. | 709/231 |
| 2005/0237929 A1 | 10/2005 | Leith et al. | 370/229 |
| 2006/0023634 A1 * | 2/2006 | Morandin | 370/252 |
| 2006/0053207 A1 | 3/2006 | Labelle et al. | 709/206 |
| 2006/0155870 A1 | 7/2006 | Tucker | 709/235 |

(Continued)

OTHER PUBLICATIONS

H. Shimonishi et al.; "TCP Congestion Control Enhancements for Streaming Media"; IEEE CCNC 2007 Proceedings of Jan. 2007, pp. 303-307.

(Continued)

*Primary Examiner* — Joseph Avellino
*Assistant Examiner* — Aftab Nasir Khan
(74) *Attorney, Agent, or Firm* — Fitzpatrick, Cella, Harper & Scinto

(57) ABSTRACT

The invention relates to a method of managing the quantity of data transmitted by a transmission device over a telecommunication network, characterized in that the method comprises the steps, carried out by the transmission device, of:
  obtaining (E503), for at least a first and second data set that have to be transmitted over the telecommunication network, the quantity of data within each data set and the time constraint on each data set;
  determining (E504) the bitrate for transmission of the first data set in accordance with the time constraint on the first data set;
  determining (E504) the bitrate for transmission of the first and second data sets in accordance with the time constraint on the second data set; and
  selecting (E504) the maximum of the determined bitrates as a parameter for managing the quantity of data transmitted by the transmission device.

12 Claims, 4 Drawing Sheets

U.S. PATENT DOCUMENTS

| | | | |
|---|---|---|---|
| 2006/0239191 A1* | 10/2006 | Wang | 370/230 |
| 2007/0086485 A1* | 4/2007 | Vega-Garcia et al. | 370/468 |
| 2007/0115814 A1* | 5/2007 | Gerla et al. | 370/230 |
| 2007/0153916 A1* | 7/2007 | Demircin et al. | 375/240.26 |
| 2008/0317117 A1 | 12/2008 | Le Floch et al. | 375/240.01 |
| 2009/0009370 A1* | 1/2009 | Hasegawa et al. | 341/61 |
| 2009/0240831 A1* | 9/2009 | Liu et al. | 709/233 |
| 2010/0049532 A1* | 2/2010 | Kuo et al. | 704/500 |
| 2010/0074113 A1* | 3/2010 | Muramoto et al. | 370/235 |
| 2010/0103817 A1* | 4/2010 | Takayanagi et al. | 370/230 |

OTHER PUBLICATIONS

Shimonishi et al., "TCP Congestion Control Enhancements for Streaming Media," Institute of Electrical and Electronics Engineers Consumer Communications and Networking Conference 2007 proceedings, 5 pages, Jan. 2007.

Schulzrinne et al., "RTP: A Transport Protocol for Real-Time Applications," Internet Engineering Task Force Request for Comments: 3550, pp. 1-93, Jul. 2003.

Ott et al., "Extended RTP Profile for Real-time Transport Control Protocol (RTCP)-Based Feedback (RTP/AVPF)," Internet Engineering Task Force Request for Comments: 4585, pp. 1-46, Jul. 2006.

Allman et al., "TCP Congestion Control," Internet Engineering Task Force Request for Comments: 2581, pp. 1-13, Apr. 1999.

\* cited by examiner

METHOD AND PROGRAM FOR MANAGING THE QUANTITY OF DATA TRANSMITTED BY A TRANSMISSION DEVICE OVER A TELECOMMUNICATION NETWORK

The present invention relates to a method of managing the quantity of data transmitted by a transmission device over a telecommunication network.

Conventionally, when a plurality of transmission devices transmit over a telecommunication network a quantity of data greater than the data transfer capacity of the telecommunication network, congestion occurs. The congestion of a telecommunication network incurs the loss of many packets and long transfer times.

The IETF RFC 2581 recommendation defines a set of techniques used by the main protocol of the Internet, namely TCP (Transmission Control Protocol), so as to solve the congestion problems.

Acknowledgement of transmitted data, or the absence of acknowledgement detected by the expiry of a timeout, are used by the transmission devices to implicitly interpret the state of the telecommunication network. For example, using delay units, the TCP transmitters and receivers may modify the behaviour of the data stream by adapting the quantity of data transmitted onto the telecommunication network at a given instant. This is what is generally called congestion control.

TCP uses a number of mechanisms to achieve good robustness faced with congestions and high performance characteristics. These mechanisms, as defined in RFC 2581, comprise inter alia the use of a sliding window (also called a congestion window), a slow-start algorithm and a congestion avoidance algorithm.

However, these mechanisms are not suitable for transferring data that has time constraints associated with it.

Data to be transferred may belong to one or more streams that can be of one given type (audio or video) or of mixed types (audio and video for example). Data may also include retransmission packets or redundancy packets (Forward Error Correction or FEC) determined using an error correcting code. Time constraints related to these data are the time limits for rendering or displaying the data at the reception device.

The time constraints associated to different data may be quite different even through these data have been generated (encoded) at the same time at the source device. Indeed, the time constraints are dependent on the type of data. For example data that belong to an audio stream may have more strict time constraints than those of a video stream data which is more tolerant to delays. Furthermore, retransmission data are also associated usually to more strict time constraint (urgent) because they relate to data that have already been transmitted and still not yet delivered.

It is thus important to be able to manage the transmission of data sets having different time constraints at the server device.

The article by Shimonishi et al. published in the journal IEEE CCNC 2007 Proceedings of January 2007, entitled "*TCP congestion control enhancements for streaming media (TCP-AV)*" considers data such as video data.

The above article describes an improvement to the TCP congestion control algorithm for the purpose of adapting it to real-time transmission of a video stream, or video streaming.

That article proposes to dynamically adapt the parameters of the TCP congestion control mechanism, such as the slow-start threshold, so as to stabilize the transmission bitrate around a fixed target bitrate matched to the video stream bitrate.

The method presented in that article uses a coder delivering data at a fixed bitrate and is not suitable for transferring data the encoding of which modifies the quantity of data transferred in order to adapt it to the capacity of the telecommunication network.

The object of the invention is to solve the drawbacks of the prior art by proposing a method and a device for managing the quantity of data transmitted by a transmission device over a telecommunication network to a receiving device that is capable of taking into account the time constraints on each of the data and also the fluctuations in the quantities of data to be transmitted.

For this purpose, according to a first aspect, the invention proposes a method of managing the quantity of data transmitted by a transmission device over a telecommunication network, characterized in that the method comprises the steps, carried out by the transmission device, of:

obtaining, for at least a first and second data set that have to be transmitted over the telecommunication network, the quantity of data within each data set and a time constraint on each data set;

determining the bitrate for transmission of the first data set in accordance with the time constraint on the first data set;

determining the bitrate for transmission of the first and second data sets in accordance with the time constraint on the second data set; and selecting the maximum of the determined bitrates as a parameter for managing the quantity of data transmitted by the transmission device.

Correspondingly, the present invention relates to a device for managing the quantity of data transmitted by a transmission device over a telecommunication network, characterized in that the management device comprises:

means of obtaining, for at least a first and second data set that have to be transmitted over the telecommunication network, the quantity of data within each data set and a time constraint on each data set;

means of determining the bitrate for transmission of the first data set in accordance with the time constraint on the first data set;

means of determining the bitrate for transmission of the first and second data sets in accordance with the time constraint on the second data set; and means of selecting the maximum of the determined bitrates as a parameter for managing the quantity of data transmitted by the transmission device.

Thus, is it possible to adapt the quantity of data transmitted by a transmission device over a telecommunication network to one or more receiving devices according to time constraints on data sets and according to the quantity of data within the data sets. The data sets may belong to one given data stream or to a plurality of data streams with different timing constraints.

According to one particular way of implementing the invention, the bitrate of the quantity of data transmitted beforehand is obtained and the bitrate of the quantity of data transmitted beforehand is also a parameter for managing the quantity of data transmitted by the transmission device.

Thus, the present invention takes into account the capacity of the telecommunication network.

According to one particular way of implementing the invention, information representative of the data transfer time for transfer via the telecommunication network is obtained and the information representative of the transfer time is also a parameter for managing the quantity of data transmitted by the transmission device.

Thus, the present invention takes into account the data transfer conditions over the telecommunication network.

According to one particular way of implementing the invention, the quantity of data transmitted is managed by means of a mechanism for managing the quantity of data transmitted between a first event and a second event and the management parameters modify the maximum quantity of data that can be transmitted between the second event and a third event.

Thus, the invention seeks to permanently adapt the data transmission rate according to the state of the telecommunication network.

According to one particular way of implementing the invention, a factor is determined from the ratio of the maximum of the determined bitrates to the bitrate of the quantity of data transmitted beforehand that is obtained and the quantity of data that can be transmitted between the second and third events is a function of this factor.

Thus, the factor makes it possible to adapt the aggressiveness in managing the quantity of transmitted data relative to the data streams using TCP-type congestion controls.

According to one particular way of implementing the invention, if the ratio of the maximum of the determined bitrates and the bitrate of the quantity of data transmitted beforehand that is obtained is greater than unity, the factor is equal to a predetermined value greater than unity or the factor is equal to the ratio of the maximum of the determined bitrates to the bitrate of the quantity of data transmitted beforehand that is obtained.

According to one particular way of implementing the invention, if the ratio of the maximum of the determined bitrates and the bitrate of the quantity of data transmitted beforehand that is obtained is smaller than unity, the factor is equal to a predetermined value smaller than unity or the factor is equal to the ratio of the maximum of the determined bitrates to the bitrate of the quantity of data transmitted beforehand that is obtained.

If the ratio is greater than unity, the management of the quantity of data transmitted is more aggressive than the conventional mechanisms. If the ratio tends towards unity, then the bandwidth of the telecommunication network will be equitably divided with the other TCP streams. However, if the ratio is less than unity, the management of the quantity of data transmitted is less aggressive than the conventional mechanisms.

According to one particular way of implementing the invention, the factor is furthermore determined from the information representative of the data transfer time for transfer via the telecommunication network.

Thus, it is possible to take into account a safety margin before the expiry of the time constraint on the first data set in the calculation of the factor so as optionally to implement error resilience techniques in the event of data loss. Thus, the aggressiveness will be greater the closer the time constraint on the first data set.

According to one particular way of implementing the invention, the second event is a non-acknowledgement of data transmitted beforehand and the quantity of data that can be transmitted between the second and third events is at most equal to:

$$cwnd(t+1) = \beta * cwnd(t) \text{ with } \beta = 1 - \frac{1}{2N(t,i)},$$

where cwnd(t) is the maximum quantity of data that can be transmitted between the first and second events and N(t,i) is the factor.

Thus, the maximum quantity of transmitted data that is transferred in the case of congestion depends on the time constraints.

According to one particular way of implementing the invention, the non-acknowledgement is obtained from a device receiving the data or is obtained in the absence of receiving a message from the device receiving the data within a predetermined time period.

According to one particular way of implementing the invention, the second event is an acknowledgement of data transmitted beforehand and the quantity of data that can be transmitted between the second and third events is at most equal to:

$$cwnd(t+1) = cwnd(t) + \alpha \text{ with } \alpha = \frac{N(t,i)}{cwnd(t)},$$

where cwnd(t) is the maximum quantity of data that can be transmitted between the first and second events and N(t,i) is the factor.

Thus, the maximum quantity of transmitted data that is transferred when the telecommunication network is not congested depends on the time constraints.

According to one particular way of implementing the invention, the data sets are images of an image sequence.

According to one particular embodiment of the invention, the data sets are transmitted to a single receiving device.

The invention also relates to a computer program stored on an information medium which, when it is loaded into and executed by a computer or a processor in a device, allows the device to implement the method described above.

The features of the abovementioned invention, together with others, will become more clearly apparent on reading the following description of an exemplary embodiment, said description being given in conjunction with the appended drawings in which.

Figure 1:
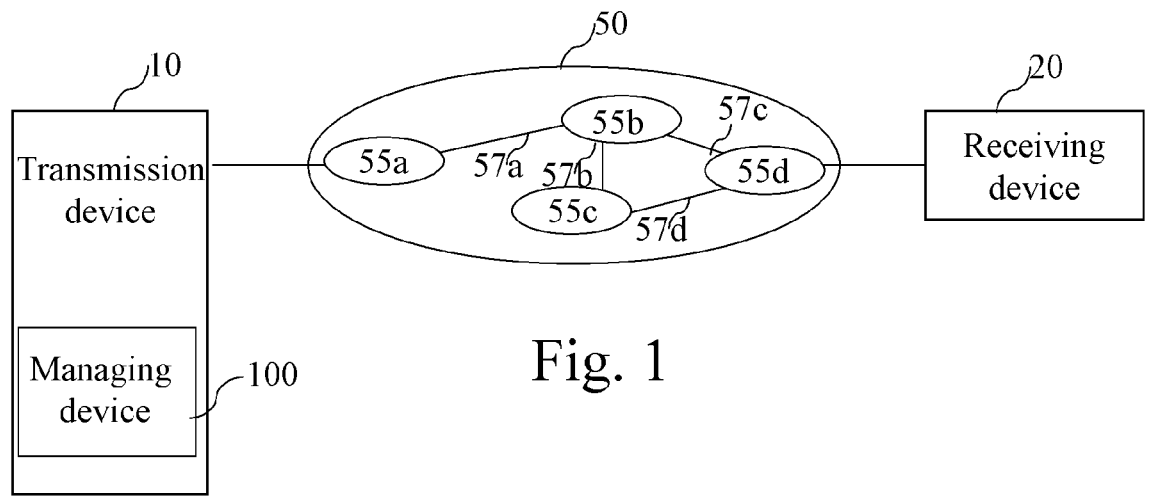
FIG. 1 shows a telecommunication system in which the present invention is implemented.

In FIG. 1, a data transmission device 10 transmits data to at least one receiving device 20 via a telecommunication network 50. The telecommunication network 50 consists for example of interconnection nodes 55a to 55d and links 57a to 57d connecting the nodes 55a to 55d together, thus creating pathways between the devices 10 and 20. The telecommunication network 50 is a network of the IP type, for example an 802.11a or b or g wireless network, or an Ethernet network, or an Internet network. The interconnection nodes 55a to 55d may be required to reject data packets when their reception memory is saturated. This situation corresponds to congestion of the telecommunication network 50. Several data transmission devices 10 (not shown in FIG. 1) are connected to the telecommunication network 50 and must share the resources, such as the bandwidth, of the telecommunication network.

A device 100 for managing the quantity of transmitted data manages the quantity of data transmitted by the data transmission device 10. The device 100 for managing the quantity of transmitted data is preferably included within the data transmission device 10.

The data transmission device 10 is for example a server for data sets with which time constraints are associated.

For example, the data is audiovisual data consisting of data sets which each have, as time constraint, the requirement to be received and reproduced by the intended receiving device 20 at a given instant.

This means that, after a certain time associated with a data set, the data set is no longer of interest to the receiving device 20.

Such data streams consisting of such data sets are MPEG2, MPEG4 and H.264/AVC data in the case of video, and for example AMR, G.711 or AAC type in the case of audio. Such data is exploited (for example, displayed or reproduced) while respecting a certain reproduction rate.

A single receiving device 20 is shown in FIG. 1 for the sake of simplification, but a larger number of receiving devices 20 are connected to the telecommunication network 50 and receive data sets from the data transmission device 10.

To transfer data, the device 100 for managing the quantity of transmitted data uses for example the RTP protocol (Real-time Transport Protocol). The RTP protocol is implemented in preference to the UDP/IP protocol (User Datagram Protocol/Internet Protocol).

The receiving device 20 sends, in response to the data received, information to the device 100 for managing the quantity of transmitted data using for example the RTCP control protocol (Real-time Transfer Control Protocol) optionally extended using the AVPF profile described in the IETF RFC 4585 recommendation entitled "*Extended RTP Profile for Real-time Transport Control Protocol (RTCP)-Based Feedback (RTP/AVPF)*".

The information sent back is for example information about the number of packets lost transporting the data sets, the level of packet loss calculated over a given period, the round trip time (RTT) of the packets transporting the data sets, the measured bandwidth, reception acknowledgements or non-acknowledgements, or any other information allowing the device 100 for managing the quantity of transmitted data to estimate the level of congestion of the telecommunication network 50 or the available bandwidth.

Figure 2:
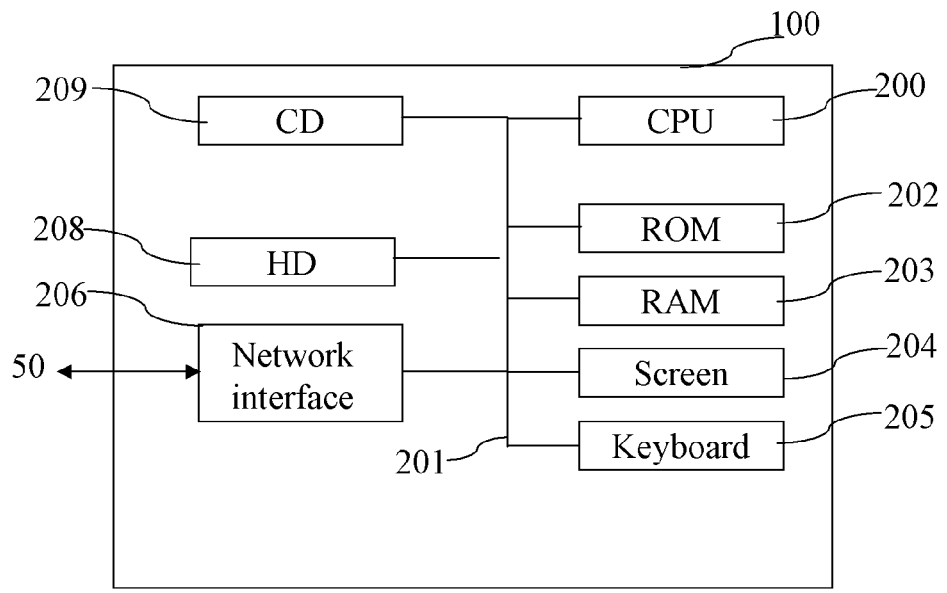
FIG. 2 shows a device for managing the quantity of data transmitted over a telecommunication network according to the present invention.

FIG. 2 shows a device for managing the quantity of data transmitted over a telecommunication network according to the present invention.

The device 100 for managing the quantity of transmitted data is for example a computer that includes a communication bus 201 to which a central processing unit (CPU) 200, a read-only memory (ROM) 202, a random-access memory (RAM) 203, a screen 204, a keyboard 205, a network interface 206, for interfacing with the telecommunication network 50, a hard disk (HD) 208 and a read/write device (CD) 209 for reading/writing data on a removable medium.

It should be pointed out here that, as a variant, the device 100 for managing the quantity of transmitted data can consist of one or more dedicated integrated circuits that are capable of implementing the method as described with reference to FIG. 5. These integrated circuits are for example and non-limitingly, integrated into an apparatus for capturing video sequences or a video sequence server.

The read-only memory ROM 202 stores inter alia the program for implementing the method, which will be described later with reference to FIG. 5.

More generally, the program is stored in a storage means. This storage means can be read by a computer or a microprocessor 200. This storage means may or may not be integrated into the device 100 for managing the quantity of transmitted data, and may be removable.

Upon turning on the device 100 for managing the quantity of transmitted data, or upon starting the software for managing the quantity of data transferred by the device 100 for managing the quantity of transmitted data, the program is transferred from the read-only memory ROM 202 to the random-access memory RAM 203 that then contains the executable code, together with the data needed to implement the embodiment.

The device 100 for managing the quantity of transmitted data also includes a screen 204 capable of reproducing information representative of the processing carried out on digital images.

The network interface 206 enables information from the receiving device 20 to be received via the telecommunication network 50.

The network interface 206 allows data sets to be transmitted in the form of packets via the telecommunication network 50 to the receiving device 20.

The hard disk 208 stores the data sets to be transmitted. As a variant, the hard disk 208 also stores the program, which program will be described later with reference to FIG. 5.

The read/write device 209 for reading/writing data on a removable storage means is for example a compact disk read/write device. The data read/write device 209 is capable of reading the program in order to transfer it to the hard disk 208. The data read/write device 209 is also capable of reading the data sets to be transferred.

Figure 3:
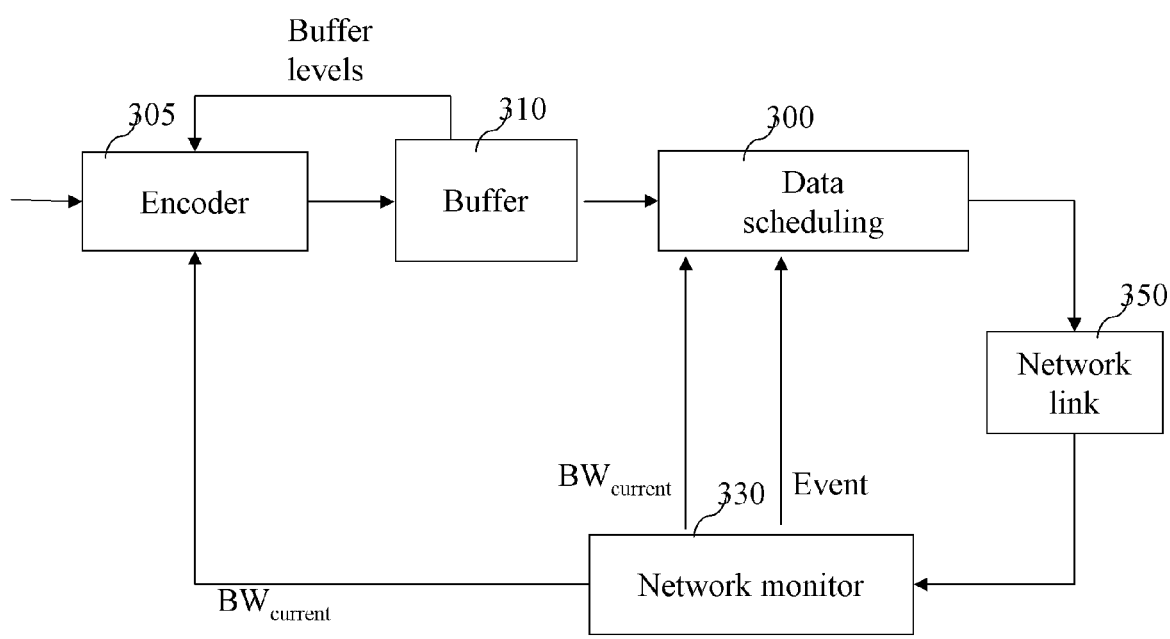
FIG. 3 shows a block diagram of the device for managing the quantity of data transmitted over a telecommunication network.

FIG. 3 shows a block diagram of the device for managing the quantity of data transmitted over a telecommunication network.

The device 100 for managing the quantity of transmitted data includes one or several encoding modules 305 for encoding the data to be transmitted. The data contains images or audio samples that may for example come from a peripheral capture device, such as a video camera or a microphone. These data are delivered at the frequency corresponding to the sampling frequency of the peripheral capture device. These images are encoded in a video compression format, such as for example MPEG2, MPEG4 or H.264/AVC and audio is encoded in an audio compression format such as AAC, complying with a given bitrate constraint. To do this, the encoding module 305 has a rate control module capable of dynamically modifying the video encoding parameters so as to comply with the bitrate constraint, for example by adapting the quantization step. The encoded data are packetized in the form of data sets in the form of data packets and temporarily stored in a buffer 310 while awaiting transmission onto the telecommunication network 50. The encoding module 305 is a software module or a dedicated encoding circuit.

To be adapted to the conditions of the telecommunication network 50, the encoding module 305 adapts its bitrate constraint according to the quantity of data contained in the transmission buffer 310. Each time the quantity of data contained in the transmission buffer 310 is below a first threshold, for example one-quarter of the size of the transmission buffer 310, or above a second threshold, for example three-quarters of the size of the transmission buffer 310, the encoding module 305 dynamically adjusts its bitrate constraint to the effective bitrate $BW_{current}$ provided by the network monitor module 330.

In the case where several encoder modules 305 are used, the effective bitrate $BW_{current}$ is shared proportionally between the different encoders. For example 90% for video and 10% for audio or the same share in the case of 2 video streams.

The transmission buffer 310 is part of the random-access memory RAM 203.

Figure 5:
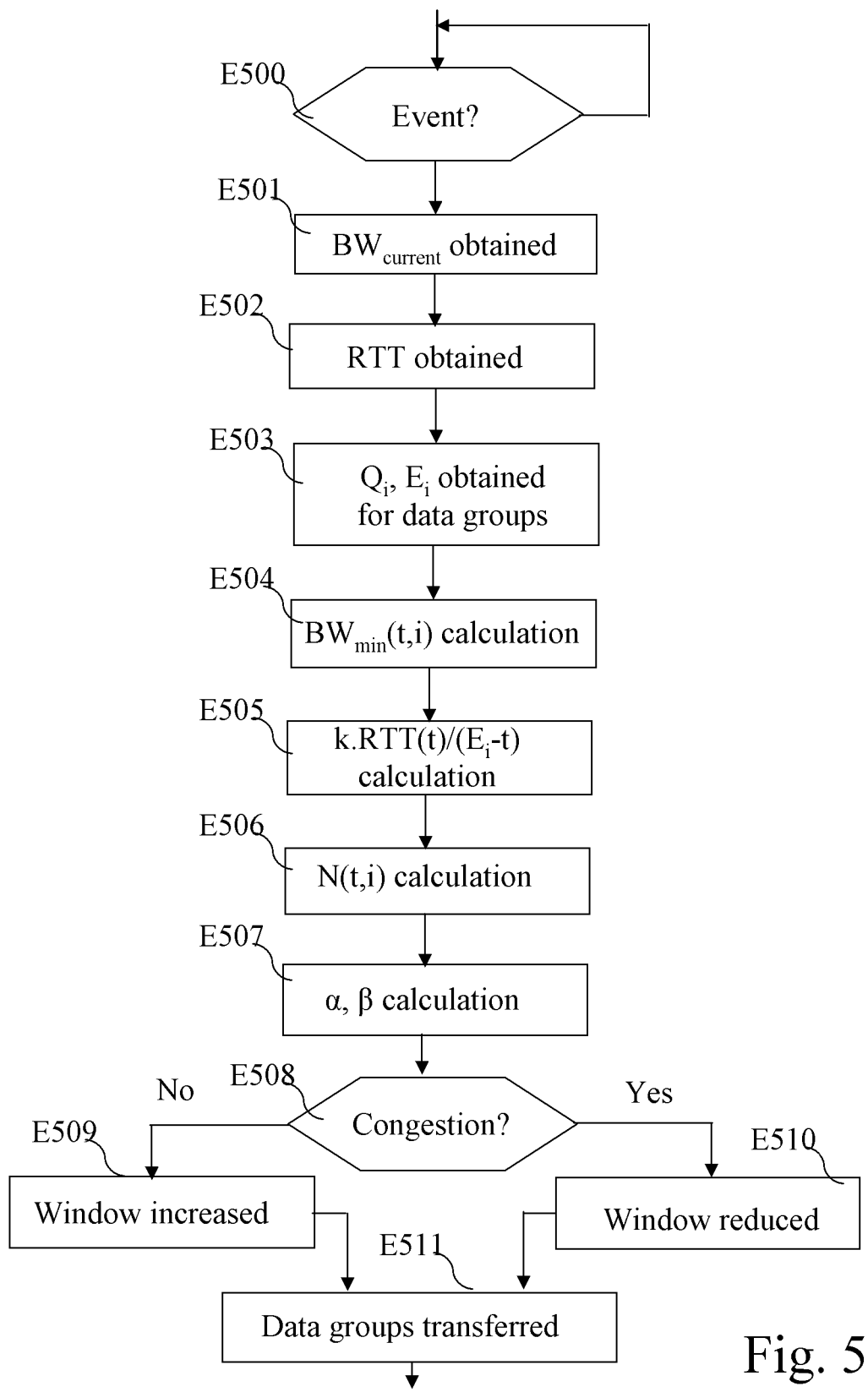
FIG. 5 shows an algorithm for managing the quantity of data transmitted by a transmission device over a telecommunication network.

The data scheduling module 300 implements the algorithm of FIG. 5. It determines the quantity of data that it can transmit over a given time period, called the "congestion window" and denoted in the rest of the description by "cwnd".

The congestion window defines the maximum quantity of data that can be transferred by the data transmission device 10 within a given time period. This time period is regularly re-evaluated, typically on the basis of information sent back by the receiving device 20. The time period is preferably the time period separating the appearance of two events. The events are for example predetermined messages received from the receiving device 20 or events determined by the device 100 for managing the quantity of transmitted data.

When the TCP protocol is used, and according to the IETF RFC 2581 recommendation, the time period of the congestion window is bounded by two events, one of which is either the reception by the device 100 for managing the quantity of transmitted data of an acknowledgement of at least one previously transmitted packet or the absence of acknowledgement detected by the expiry of a timeout (the timeout thus indicating possible congestion in the telecommunication network). The absence of acknowledgement may also be detected by the reception of a number of successive acknowledgements for one and the same set of previously transmitted data.

In other protocol variants, the time period of the congestion window may be defined on the basis of information sent back by the receiving device 20. For example, the time period is defined as a multiple of the RTT and the congestion window is calculated using the RTT and the packet loss rate updated by the receiving device 20.

The data scheduling module 300 may be implemented by the processor 200 of FIG. 2 or a dedicated circuit.

The data packets are transmitted by the data scheduling module 300 to the receiving device 20 via the network link 350 and the telecommunication network 50.

The network monitor module 330 calculates, from the information received from the receiving device 20, the effective bitrate $BW_{current}$ currently used by the device 100 for managing the quantity of transmitted data for transmitting the data sets.

The effective bitrate $BW_{current}$ calculated by the network monitor module 330 is used by the data scheduling module 300 as a parameter for managing the quantity of transmitted data. As a variant, the effective bitrate $BW_{current}$ is calculated and transmitted to the network monitor module 330 by the receiving device 20. The network monitor module 330 transfers the effective bitrate $BW_{current}$ to the data scheduling module 300. The network monitor module 330 also calculates the round-trip time (RTT) of a packet on the network and transfers this round-trip time to the data scheduling module 300. The network monitor module 330 is implemented by the processor 200 of FIG. 2 or a dedicated circuit. The network monitor module 330 determines the events and transmits them to the data scheduling module 330.

Figure 4:
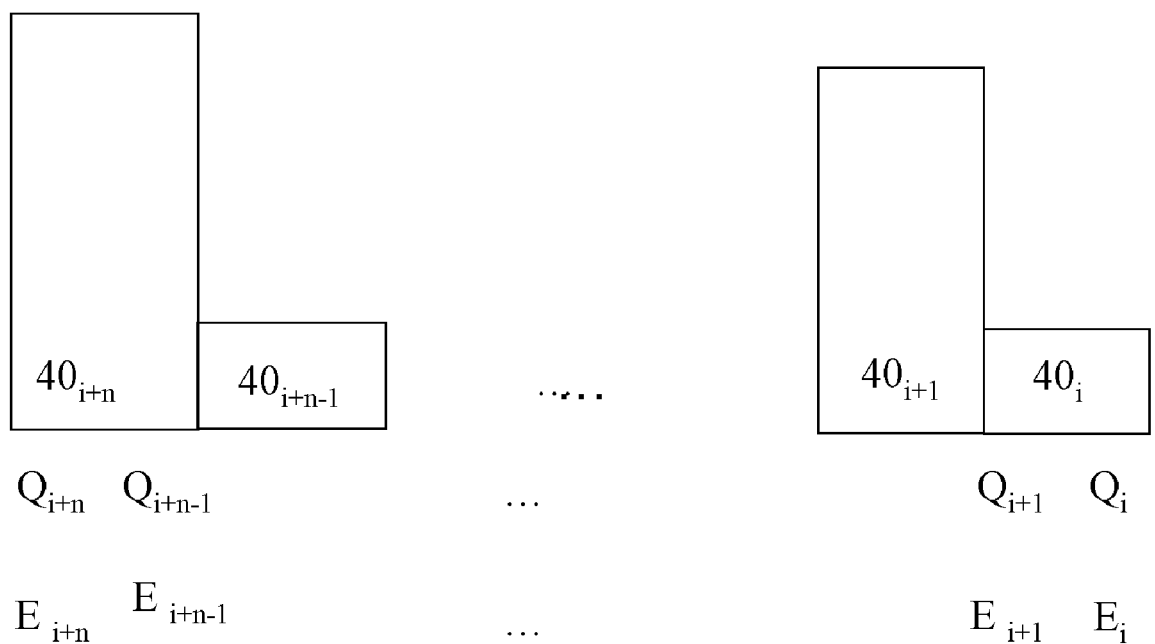
FIG. 4 shows data sets that have to be transmitted over the telecommunication network.

FIG. 4 shows data sets representing sequential image data, denoted by $40_i$ to $40_{i+n}$ that have to be transmitted over the telecommunication network 50.

The data sets denoted by $40_i$ to $40_{i+n}$ are preferably intended for a single receiving device 20. As a variant, the data sets denoted by $40_i$ to $40_{i+n}$ are intended for various receiving devices 20.

The data sets $40_i$ to $40_{i+n}$ are stored in the buffer 310 of FIG. 3. Each data set 40 is transferred in the form of one or more data packets.

Associated with each data set 40 is a data quantity Q and a time constraint E.

The quantity of data $Q_i$ is the quantity of data contained in the data set $40_i$ and the time constraint $E_i$ represents the time before which the data set $40_i$ has to reach the receiving device 20 in order to be able to be processed. Beyond this time, the data set $40_i$ is no longer processed by the receiving device 20, as the time for display of the image or to render the audio represented by the data set has passed.

The time constraint $E_i$ of a data set $40_i$ may be estimated using the following formula:

$$E_i = \text{Const} + i \times (1/\text{sampling frequency}).$$

Const represents the time at which the first data set has been processed by the receiving device 20 and i represents the position of the data set $40_i$ in the data stream formed by all the data sets. This value is either sent back by the receiving device 20 or is approximated by the device 100 for managing the quantity of transmitted data as being the time for sending the first packet of the first data set. The Const value may be different between two video streams or between audio and video streams if the rendering constraints are different.

The quantity of data $Q_{i+1}$ is the quantity of data contained in the data set $40_{i+i}$ and the time constraint $E_{i+1}$ represents the time before which the data set $40_{i+1}$ must reach the receiving device 20 in order to be able to be processed. After this time, the data set $40_{i+1}$ is no longer processed by the receiving device 20, as it is obsolete.

The quantity of data $Q_{i+n-1}$ is the quantity of data contained in the data set $40_{+n-1}$ and the time constraint $E_{i+n-1}$ represents the time before which the data set $40_{i+n-1}$ must reach the receiving device 20 in order to be able to be processed. After this time, the data set $40_{i+n-1}$ is no longer processed by the receiving device 20, as it is obsolete.

The quantity of data $Q_{i+n}$ is the quantity of data contained in the data set $40_{i+n}$ and the time constraint $E_{i+n}$ represents the time before which the data set $40_{i+n}$ must reach the receiving device 20 in order to be able to be processed. After this time, the data set $40_{i+n}$ is no longer processed by the receiving device 20, as it is obsolete.

It should be pointed out here that the quantities of data Q vary through the nature of the data or through the encoding adaptation carried out by the encoding module 305 of FIG. 3.

FIG. 5 shows an algorithm for managing the quantity of data transmitted by a transmission device over a telecommunication network.

The present algorithm is executed by the data scheduling module 300.

Step E500 is a loop for awaiting the reception of an event by the data scheduling module 300 or a loop for awaiting the expiry of a time period.

The data scheduling module 300 receives an event from the network monitor module 330. The event is representative of a congestion of the telecommunication network 50 or it is representative of an acknowledgement, by the receiving device 20, of received packets.

In the next step E501, the data scheduling module 300 receives the effective bitrate $BW_{current}$ from the network monitor module 330.

In the next step E502, the data scheduling module 300 obtains the round-trip time (RTT) of the data packets.

In the next step E503, the data scheduling module 300 obtains, for at least a first and second data set that have to be transmitted over the telecommunication network, the quantity of data contained in each data set and the transmission time constraint on each data set.

Preferably, the data scheduling module 300 obtains, for each data set 40 stored in the buffer 310, the quantity of data Q contained in each data set 40 and the transmission time constraint E on each data set 40.

In the following step E504, the data scheduling module 300 determines the minimum bitrate needed to transfer the data sets 40 to the receiving device 20, while complying with the time constraints on the data sets 40.

This is because, at a current instant t, if the data scheduling module 300 wishes to comply with the time constraint on each data set 40, the transmission rate over the telecommunication network 50 must be sufficient to transmit the quantity of data $Q_i$ corresponding to the first image i contained in the buffer 310 within a time at most equal to $E_i-t$, that is to say the minimum bitrate must be at least equal to $Q_i/(E_i-t)$ in order to comply with the deadline $E_i$.

Likewise, to comply with the time constraint $E_{i+1}$, the data scheduling module 300 must also transmit the quantity of data $Q_{i+1}+Q_i$ within a time of at most $E_{i+1}-t$. The minimum bitrate for transmitting the data sets $40_i$ and $40_{i+1}$ is therefore the maximum of the two calculated bitrates. By continuing the reasoning over all the data sets 40 contained in the transmission buffer 310, the following formula is obtained for calculating the transmission bitrate that meets all the time constraints:

$$BW_{min}(t, i) = \max_{N=0}^{n}\left(\frac{\sum_{j=0}^{N} Q_{i+j}}{E_{i+N} - t}\right),$$

where i represents the index of the first data set contained in the buffer 310 and i+n represents the index of the last data set contained in the buffer 310, t represents the current time, n is the number of data sets contained in the transmission buffer 310, N and j are variables, and $BW_{min}(t(i)$ is the minimum bitrate needed to transfer all the data sets 40 to the receiving device 20 while complying with the time constraints on the data sets 40.

In a preferred variant, in the following step E505, the data scheduling module 300 calculates the following ratio $$\frac{k \cdot RTT(t)}{E_i - t}$$

where RTT(t) represents the round-trip time of a network packet at time t and k is a predefined constant.

In the next step E506, the data scheduling module 300 calculates a first factor N(t,i) from the following formula:

$$N(t, i) = \frac{BW_{min}(t, i)}{BW_{current}(t)} * \left(\frac{k \cdot RTT(t)}{E_i - t}\right);$$

as a variant, N(t,i) is calculated from the following formula:

$$N(t, i) = \frac{BW_{min}(t, i)}{BW_{current}(t)}.$$

In the next step E507, the data scheduling module 300 calculates a second factor $\alpha$ and a third factor $\beta$ from the following formulae:

$$\beta = 1 - \frac{1}{2N(t, i)},$$

$$\alpha = \frac{N(t, i)}{cwnd(t)}.$$

As a variant, if $$\frac{BW_{min}(t, i)}{BW_{current}(t)} > 1, \alpha = \frac{N'}{cwnd(t)} \text{ and } \beta = 1 - \frac{1}{2N''},$$

where N' and N" are predetermined values greater than unity.
In another variant, if $$\frac{BW_{min}(t, i)}{BW_{current}(t)} < 1, \alpha = \frac{N'''}{cwnd(t)} \text{ and } \beta = 1 - \frac{1}{2N''''},$$

where N''' and N'''' are predetermined values of less than unity.

In step E508, the data scheduling module 300 checks whether the event received in step E500 is representative of a congestion of the telecommunication network 50.

If the event is representative of a congestion of the telecommunication network 50, the data scheduling module 300 passes to step E510. If the event is not representative of a congestion of the telecommunication network 50, the data scheduling module 300 passes to step E509.

In step E509, the data scheduling module 300 determines the maximum quantity of data that can be transferred by the data transmission device 10 within the given time period. In other words, the data scheduling module 300 determines a new congestion window "cwnd" in accordance with the following formula:

$$cwnd(t + 1) = cwnd(t) + \alpha \text{ with } \alpha = \frac{N(t, i)}{cwnd(t)},$$

where cwnd(t) is the previous congestion window and cwnd(t+T) is the new congestion window.

It should be pointed out here that if the minimum bitrate needed to transfer all the data sets 40 is greater than the effective bitrate $BW_{current}$, the factor $\alpha$ is greater than unity.

If the factor $\alpha$ is greater than unity, the new congestion window increases more rapidly than a congestion window increased in accordance with the IETF RFC 2581 recommendation.

This more rapid increase is representative of a more aggressive behaviour of the device 100 for managing the quantity of transmitted data compared with the behaviour of other devices that implement the IETF RFC 2581 recommendation.

By having such aggressive behaviour, the device 100 for managing the quantity of transmitted data will obtain an effective bitrate $BW_{current}$ greater than the other devices that implement the IETF RFC 2581 recommendation.

It should be pointed out here that if the minimum bitrate needed to transfer the data sets 40 is lower than the effective bitrate $BW_{current}$, the factor $\alpha$ is less than unity.

If the factor $\alpha$ is less than unity, the new congestion window increases less rapidly than a congestion window increased in accordance with the IETF RFC 2581 recommendation.

This less rapid increase is representative of a less aggressive behaviour of the device 100 for managing the quantity of transmitted data compared with the behaviour of other devices that implement the IETF RFC 2581 recommendation.

By having such behaviour, the device 100 for managing the quantity of transmitted data will obtain an effective bitrate $BW_{current}$ lower than the other devices that implement the IETF RFC 2581 recommendation.

The factor $N(t,i)$ is thus representative of the aggressiveness.

Thus, it is possible to adapt the aggressiveness so that a data stream having, at a given instant, stronger or weaker time constraints than another data stream has an effective bitrate $BW_{current}$ higher or lower than the other devices that implement the IETF RFC 2581 recommendation.

It should be pointed out here that when $$N(t, i) = \frac{BW_{min}(t, i)}{BW_{current}(t)} * \left(\frac{k \cdot RTT(t)}{E_i - t}\right), \text{ the ratio } \left(\frac{k \cdot RTT(t)}{E_i - t}\right)$$

allows a safety margin to be taken into account before the expiry of the time constraint $E_i$ in calculating the factor $N(t,i)$ so as optionally to implement error resilience techniques in the case of a loss of data. Thus, the aggressiveness will be greater the closer the deadline $E_i$ of the first data set 40.

Having carried out this operation, the data scheduling module 300 passes to step E511 and proceeds to transferring the data sets 40 in accordance with the new quantity of data determined.

Having carried out this operation, the data scheduling module 300 returns to step E500.

In step E510, the data scheduling module 300 determines a maximum quantity of data that can be transferred by the data transmission device 10 within the given time period. In other words, the data scheduling module 300 determines a new congestion window cwnd in accordance with the following formula:

$$cwnd(t+1) = \beta * cwnd(t) \text{ with}$$

$$\beta = 1 - \frac{1}{2N(t)},$$

where cwnd(t) is the previous congestion window and cwnd(t+1) is the new congestion window.

Having carried out this operation, the data scheduling module 300 passes to step E511 described above.

Of course, the present invention is in no way limited to the embodiments described here, rather it encompasses, quite to the contrary, any variant within the competence of a person skilled in the art and in particular a combination of the various embodiments of the present invention.

This application claims priority from French application Ser. No. 07/07632 filed on 30 Oct. 2008, which is hereby incorporated by reference in its entirety.

The invention claimed is:

1. A method of managing quantities of data transmitted by a transmission device over a telecommunication network, the method being performed by the transmission device, the method comprising:

for at least a first data set and a second data set to be transmitted over the telecommunication network, obtaining a quantity of data within each data set and a time constraint on each data set, the time constraint on the first data set representing a time before which the first data set must reach a receiving device and the time constraint on the second data set representing a time before which the second data set must reach the receiving device;

determining a bitrate for transmitting the first data set in accordance with the time constraint on the first data set;

determining a bitrate for transmitting the first and second data sets in accordance with the time constraint on the second data set;

selecting a maximum of the determined bitrates as a parameter for managing a quantity of data transmitted by the transmission device;

determining a factor from a ratio of the maximum of the determined bitrates to a bitrate of a quantity of data transmitted previously between a first event and a second event wherein, when the ratio of the maximum of the determined bitrates to the bitrate of the quantity of data transmitted previously between the first event and the second event is greater than unity, the factor is equal to a predetermined value greater than unity or the factor is equal to the ratio of the maximum of the determined bitrates to the bitrate of the quantity of data transmitted previously between the first event and the second event; and managing the quantity of data transmitted over the telecommunication network by controlling a quantity of data transmitted between the second event and a third event, the quantity of data transmitted between the second and third events being a function of the determined factor.

2. The method according to claim 1, further comprising obtaining a transmission time via the telecommunication network, wherein the transmission time also is a parameter for managing the quantity of data transmitted by the transmission device.

3. The method according to claim 1, wherein, if the ratio of the maximum of the determined bitrates to the bitrate of the quantity of data transmitted previously between the first event and the second event is smaller than unity, the factor is equal to a predetermined value smaller than unity or the factor is equal to the ratio of the maximum of the determined bitrates to the bitrate of the quantity of data transmitted previously between the first event and the second event.

4. The method according to claim 1, wherein the factor also is determined from a transmission time obtained via the telecommunication network.

5. The method according to claim 1, wherein the second event is an acknowledgement of data transmitted previously between the first event and the second event and the quantity of data transmitted between the second and third events is at most equal to:

$$cwnd(t+1)=cwnd(t)+\alpha \text{ with}$$

$$\alpha = \frac{N(t, i)}{cwnd(t)},$$

where cwnd(t) is the maximum quantity of data transmitted between the first and second events and N(t,i) is the factor.

6. The method according to claim 1, wherein the data sets are images of an image sequence.

7. The method according to claim 1, wherein the data sets are transmitted to a single receiving device.

8. The method according to claim 1, wherein the second event is a non-acknowledgement of data transmitted previously between the first event and the second event and the quantity of data transmitted between the second and third events is at most equal to:

$$cwnd(t+1)=\beta * cwnd(t) \text{ with}$$

$$\beta = 1 - \frac{1}{2N(t, i)},$$

where cwnd(t) is the maximum quantity of data transmitted between the first and second events and N(t,i) is the factor.

9. The method according to claim 8, wherein the non-acknowledgement is obtained from a device receiving the data or is obtained in an absence of receiving a message from the device receiving the data within a predetermined time period.

10. A device for managing quantities of data transmitted by a transmission device over a telecommunication network, the device comprising:
    means for obtaining, for at least a first data set and a second data set to be transmitted over the telecommunication network, a quantity of data within each data set and a time constraint on each data set, the time constraint on the first data set representing a time before which the first data set must reach a receiving device and the time constraint on the second data set representing a time before which the second data set must reach the receiving device;
    means for determining a bitrate for transmitting the first data set in accordance with the time constraint on the first data set;
    means for determining a bitrate for transmitting the first and second data sets in accordance with the time constraint on the second data set;
    means for selecting a maximum of the determined bitrates as a parameter for managing a quantity of data transmitted by the transmission device,
    wherein the device is configured to determine a factor from a ratio of a maximum of the determined bit rates to a bitrate of a quantity of data transmitted previously between a first event and a second event; and
    wherein the device is configured to control a quantity of data transmitted over the telecommunication network between the second event and a third event, the quantity of data transmitted between the second and third events being a function of the factor, and
    wherein, when the ratio of the maximum of the determined bitrates to the bitrate of the quantity of data transmitted previously between the first event and the second event is greater than unity, the factor is equal to a predetermined value greater than unity or the factor is equal to the ratio of the maximum of the determined bitrates to the bitrate of the quantity of data transmitted previously between the first event and the second event.

11. A non-transitory computer-readable storage medium storing a computer program that, when executed by a computer processor of a transmission device, causes the transmission device to perform a method of managing quantities of data transmitted by the transmission device over a telecommunication network, wherein the method comprises:
    for at least a first data set and a second data set to be transmitted over the telecommunication network, a quantity of data within each data set and a time constraint on each data set, the time constraint on the first data set representing a time before which the first data set must reach a receiving device and the time constraint on the second data set representing a time before which the second data set must reach the receiving device;
    determining a bitrate for transmitting the first data set in accordance with the time constraint on the first data set;
    determining a bitrate for transmitting the first and second data sets in accordance with the time constraint on the second data set;
    selecting a maximum of the determined bitrates as a parameter for managing the quantity of data transmitted by the transmission device;
    determining a factor from a ratio of a maximum of the determined bitrates to a bitrate of a quantity of data transmitted previously between a first event and a second event wherein, when the ratio of the maximum of the determined bitrates to the bitrate of the quantity of data transmitted previously between the first event and the second event is greater than unity, the factor is equal to a predetermined value greater than unity or the factor is equal to the ratio of the maximum of the determined bitrates to the bitrate of the quantity of data transmitted previously between the first event and the second event; and
    managing the quantity of data transmitted over the telecommunication network by controlling a quantity of data transmitted between the second event and a third event, the quantity of data transmitted between the second and third events being a function of the factor.

12. A device for managing quantities of data transmitted by a transmission device over a telecommunication network, the device comprising:
    a Central Processing Unit (CPU) coupled to a memory unit,
    wherein the CPU is configured to receive, for at least a first and a second data set to be transmitted over the telecommunication network, a quantity of data within each data set and a time constraint on each data set, the time constraint on the first data set representing a time before which the first data set must reach a receiving device and the time constraint on the second data set representing a time before which the second data set must reach the receiving device,
    wherein the CPU is configured to determine a bitrate for transmitting the first data set in accordance with the time constraint on the first data set,
    wherein the CPU is configured to determine a bitrate for transmitting the first and second data sets in accordance with the time constraint on the second data set, wherein the CPU is configured to select a maximum of the determined bitrates as a parameter for managing a quantity of data transmitted by the transmission device, wherein the CPU is configured to determine a factor from a ratio of a maximum of the determined bit rates to a bitrate of a quantity of data transmitted previously between a first event and a second event, wherein, when the ratio of the maximum of the determined bitrates to the bitrate of the quantity of data transmitted previously between the first event and the second event is greater than unity, the factor is equal to a predetermined value greater than unity or the factor is equal to the ratio of the maximum of the determined bitrates to the bitrate of the quantity of data transmitted previously between the first event and the second event, and wherein the CPU is configured to control a quantity of data transmitted over the telecommunication network between the second event and a third event, the quantity of data transmitted between the second and third events being a function of the factor.

* * * * *